US009165690B2

(12) United States Patent
Singh et al.

(10) Patent No.: US 9,165,690 B2
(45) Date of Patent: Oct. 20, 2015

(54) SYSTEM AND METHOD FOR PREPARING A CONTAINER LOADED WITH WET RADIOACTIVE ELEMENTS FOR DRY STORAGE

(71) Applicant: Holtec International, Inc., Marlton, NJ (US)

(72) Inventors: Krishna P. Singh, Hobe Sound, FL (US); John D. Griffiths, Deptford, NJ (US)

(73) Assignee: HOLTEC INTERNATIONAL

( * ) Notice: Subject to any disclaimer, the term of this patent is extended or adjusted under 35 U.S.C. 154(b) by 0 days.

(21) Appl. No.: 14/060,384

(22) Filed: Oct. 22, 2013

(65) Prior Publication Data

US 2014/0047733 A1    Feb. 20, 2014

Related U.S. Application Data

(62) Division of application No. 12/342,022, filed on Dec. 22, 2008, now Pat. No. 8,561,318.

(60) Provisional application No. 61/016,151, filed on Dec. 21, 2007.

(51) Int. Cl.
*F26B 5/04* (2006.01)
*F26B 5/12* (2006.01)
(Continued)

(52) U.S. Cl.
CPC ... *G21F 5/06* (2013.01); *F26B 5/04* (2013.01); *F26B 5/12* (2013.01); *F26B 21/08* (2013.01); *F26B 21/14* (2013.01); *G21C 19/32* (2013.01); *G21F 9/34* (2013.01)

(58) Field of Classification Search
CPC ............ F26B 21/08; F26B 21/14; F26B 5/04; F26B 5/12; G21C 19/32; G21F 5/06; G21F 9/34
See application file for complete search history.

(56) References Cited

U.S. PATENT DOCUMENTS 2,081,128 A * 5/1937 Volpin ............................. 62/80
2,421,121 A * 5/1947 Haagen-Smit .................. 34/448
(Continued)

FOREIGN PATENT DOCUMENTS

| DE | 3226986 | 1/1984 |
|---|---|---|
| DE | 19814791 | 11/1999 |

(Continued)

OTHER PUBLICATIONS

Abstract for Tajima et al., JP55-19712, Feb. 1980.

*Primary Examiner* — Jiping Lu
(74) *Attorney, Agent, or Firm* — The Belles Group, P.C.

(57) ABSTRACT

A method for preparing a cavity loaded with wet radioactive elements for dry storage, the method including: connecting a condensing module, a vacuum module, and a gas circulator module to the cavity so as to form a hermetically sealed closed-loop path that includes the cavity; filling the closed-loop path with a non-reactive gas; circulating the non-reactive gas through the closed-loop path until the condensing module is no longer removing substantial amounts of water from the circulating non-reactive gas, wherein the vacuum module is sealed off from the closed-loop path during the circulating; discontinuing the circulation of the non-reactive gas through the closed-loop path; fluidly coupling the vacuum module to the cavity and fluidly isolating the cavity and the vacuum module; and applying a vacuum pressure to the cavity via the vacuum module so as to create a sub-atmospheric pressure within the cavity.

16 Claims, 5 Drawing Sheets

(51) Int. Cl.
*G21F 5/06* (2006.01)
*G21F 9/34* (2006.01)
*G21C 19/32* (2006.01)
*F26B 21/08* (2006.01)
*F26B 21/14* (2006.01)

(56) References Cited

U.S. PATENT DOCUMENTS

| | | | |
|---|---|---|---|
| 3,010,889 A | 11/1961 | Fortescue et al. | |
| 3,448,859 A | 6/1969 | Hall et al. | |
| 3,666,616 A | 5/1972 | Schluderberg | |
| 3,865,688 A | 2/1975 | Kleimola | |
| 3,950,152 A | 4/1976 | Guon | |
| 4,709,579 A | 12/1987 | Parker et al. | |
| 4,755,347 A | 7/1988 | Tolmie | |
| 4,828,760 A | 5/1989 | Chung et al. | |
| 4,952,339 A | 8/1990 | Temus et al. | |
| 5,453,562 A | 9/1995 | Swanstrom et al. | |
| 5,646,971 A | 7/1997 | Howe | |
| 5,839,206 A | 11/1998 | Lisson et al. | |
| 5,898,747 A | 4/1999 | Singh | |
| 6,372,157 B1 | 4/2002 | Krill et al. | |
| 6,680,994 B2 * | 1/2004 | Jones et al. | 376/250 |
| 6,684,526 B2 | 2/2004 | Tully | |
| 7,096,600 B2 | 8/2006 | Singh | |
| 7,210,247 B2 | 5/2007 | Singh | |
| 2006/0272175 A1 | 12/2006 | Singh | |
| 2008/0056935 A1 | 3/2008 | Singh | |

FOREIGN PATENT DOCUMENTS

| | | |
|---|---|---|
| EP | 1429344 | 6/2004 |
| GB | 2096520 | 10/1982 |
| JP | 5519712 | 2/1980 |
| JP | 61251798 | 11/1986 |
| JP | 2004219408 | 8/2004 |

* cited by examiner

SYSTEM AND METHOD FOR PREPARING A CONTAINER LOADED WITH WET RADIOACTIVE ELEMENTS FOR DRY STORAGE

CROSS-REFERENCE TO RELATED PATENT APPLICATIONS

The present application is a divisional application of U.S. Nonprovisional patent application Ser. No. 13/342,022, filed Dec. 22, 2008, (now U.S. Pat. No. 8,561,318), which in turn claims the benefit of U.S. Provisional Patent Application Ser. No. 61/016,151, filed Dec. 21, 2007, the disclosures of which are incorporated by reference in their entireties.

FIELD OF THE INVENTION

The present invention relates generally to systems and methods of preparing a container loaded with wet radioactive elements, such as a multi-purpose canister or a thermally conductive cask, for dry storage, and specifically to a closed-loop system and method of drying a multi-purpose canister for dry storage using a forced gas flow.

BACKGROUND OF THE INVENTION

In the operation of nuclear reactors, hollow zircaloy tubes filled with enriched uranium, known as fuel assemblies, are burned up inside the nuclear reactor core. It is customary to remove these fuel assemblies from the reactor after their energy has been depleted down to a predetermined level. Upon depletion and subsequent removal, this spent nuclear fuel ("SNF") is still highly radioactive and produces considerable heat, requiring that great care be taken in its subsequent packaging, transporting, and storing. Specifically, the SNF emits extremely dangerous neutrons and gamma photons. It is imperative that these neutrons and gamma photons be contained at all times subsequent to removal from the reactor core.

In defueling a nuclear reactor, it is common place to remove the SNF from the reactor and place the SNF under water, in what is generally known as a spent fuel pool or pond storage. The pool water facilitates cooling the SNF and provides adequate radiation shielding. The SNF is stored in the pool for a period long enough to allow the decay of heat and radiation to a sufficiently low level to allow the SNF to be transported with safety. However, because of safety, space, and economic concerns, use of the pool alone is not satisfactory where the SNF needs to be stored for any considerable length of time. Thus, when long-term storage of SNF is required, it is standard practice in the nuclear industry to store the SNF in a dry state subsequent to a brief storage period in the spent fuel pool, i.e., storing the SNF in a dry inert gas atmosphere encased within a structure that provides adequate radiation shielding. One typical structure that is used to store SNF for long periods of time in the dry state is a storage cask.

Storage casks have a cavity adapted to receive a canister of SNF and are designed to be large, heavy structures made of steel, lead, concrete and an environmentally suitable hydrogenous material. However, because the focus in designing a storage cask is to provide adequate radiation shielding for the long-term storage of SNF, size and weight are often secondary considerations (if considered at all). As a result, the weight and size of storage casks often cause problems associated with lifting and handling. Typically, storage casks weigh more than 100 tons and have a height greater than 15 ft. A common problem associated with storage casks is that they are too heavy to be lifted by most nuclear power plant cranes. Another common problems is that storage casks are generally too large to be placed in spent fuel pools. Thus, in order to store SNF in a storage cask subsequent to being cooled in the pool, the SNF is transferred to a cask, removed from the pool, placed in a staging area, dewatered, dried, and transported to a storage facility. Adequate radiation shielding is needed throughout all stages of this transfer procedure.

As a result of the SNF's need for removal from the spent fuel pool and additional transportation to a storage cask, an open canister is typically submerged in the spent fuel pool. The SNF rods are then placed directly into the open canister while submerged in the water. However, even after sealing, the canister alone does not provide adequate containment of the SNF's radiation. A loaded canister cannot be removed or transported from the spent fuel pool without additional radiation shielding. Thus, apparatus that provide additional radiation shielding during the transport of the SNF is necessary. This additional radiation shielding is achieved by placing the SNF-loaded canisters in large cylindrical containers called transfer casks while still within the pool. Similar to storage casks, transfer casks have a cavity adapted to receive the canister of SNF and are designed to shield the environment from the radiation emitted by the SNF within.

In facilities utilizing transfer casks to transport loaded canisters, an empty canister is first placed into the cavity of an open transfer cask. The canister and transfer cask are then submerged in the spent fuel pool. Prior to cask storage, the SNF is removed from the reactor and placed in wet storage racks arrayed on the bottom of spent fuel pools. For dry storage, the SNF is transferred in the submerged canister that is flooded with water and within the transfer cask. The loaded canister is then fitted with its lid, enclosing the SNF and the water from the pool within. The loaded canister and transfer cask are then removed from the pool by a crane and set down in a staging area to prepare the SNF-loaded canister for long-term dry storage. In order for an SNF-loaded canister to be properly prepared for dry storage, the United States Nuclear Regulatory Commission "N.R.C.") requires that the SNF and interior of the canister be adequately dried before the canister is sealed and transferred to the storage cask. Specifically, N.R.C. regulations mandate that the vapor pressure ("vP") within the canister be below 3 Torrs (1 Torr=1 mm Hg) before the canister is backfilled with an inert and sealed. Vapor pressure is the pressure of the vapor over a liquid at equilibrium, wherein equilibrium is defined as that condition where an equal number of molecules are transforming from the liquid phase to gas phase as there are molecules transforming from the gas phase to liquid phase. Requiring a low vP of 3 Torrs or less assures that an adequately low amount of moisture exists in the interior of the canister and on the SNF so that the SNF is sufficiently dry for long-term storage.

Currently, nuclear facilities comply with the N.R.C.'s 3 Torrs or less vP requirement by performing a vacuum drying process. In performing this process, the bulk water that is within the canister is first drained from the canister. Once the bulk of the liquid water is drained, a vacuum system is coupled to the canister and activated so as to create a sub-atmospheric pressure condition within the canister. The sub-atmospheric condition within the canister facilities evaporation of the remaining liquid water while the vacuum helps remove the water vapor. The vP within the canister is then measured by placing appropriate measuring instruments, such as vacuum gages, into the canister and taking direct measurements of the gaseous contents present therein. If necessary, this vacuum procedure is repeated until a vP of 3 Torrs or less is obtained. Once an acceptable vP is reached, the canister is backfilled with an inert gas and the canister is sealed. The transfer cask (with the canister therein) is then transported to a position above a storage cask and the SNF-loaded canister is lowered into the low storage for long-term storage.

Current methods of satisfying the N.R.C.'s 3 Torrs or less vP requirement are potentially dangerous, operationally time consuming, prone to error, subjects the SNF rods to high temperatures, and costly. First, the intrusive nature of the direct vP measurement is dangerous because the canister contains highly radioactive SNF. Any time the canister must be physically breached, there is the danger of exposing the surrounding environment and the work personnel to radiation. Moreover, the prolonged creation of sub-atmospheric conditions in the canister can cause complicated equipment problems. Finally, the operational durations for vacuum drying are unacceptably long as vacuum drying times on the order of days is quite common. The vacuum operation is prone to line freeze ups and ice formation inside canister which can give false readings to the instruments. Lowering of the canister pressure causes a progressive loss of the heat transfer medium (gas filling the gaps and open spaces in the canisters) resulting in substantial elevation of temperature of heat producing SNF rods.

One of the major disadvantages of existing vacuum drying systems and methods is that the SNF cladding heats up to unacceptable temperatures that may compromise the fuel cladding integrity. In order for liquid water to be removed from the SNF canister using the existing vacuum drying process, the canister must be held at a low vacuum level for an extended period while the liquid water boils off. The extended period of time when the fuel is surrounded by a near vacuum impedes removal of the decay heat from the fuel itself.

Recently, the assignee of the present application, Holtec International, Inc., has developed new and improved methods, apparatus and systems for preparing canisters of spent nuclear fuel for dry storage utilizing forced gas dehydration ("FGD"). These inventions are fully described and disclosed in U.S. Pat. No. 7,210,247, issued May 1, 2007, Krishna Singh and United States Patent Application Publication 2006/0272175A1, published Dec. 7, 2006, Krishna Singh, the entireties of which are incorporated herein by reference.

It has been discovered that the FGD drying methods, apparatus and systems disclosed in U.S. Pat. No. 7,210,247 and United States Patent Application Publication 2006/0272175A1 can be improved and/or simplified in a novel and non-obvious manner. Referring to FIG. 3, the FGD technologies disclosed in the aforementioned references consist of an air or liquid cooled condenser module, a freeze drying module, a circulator module, and a pre-heater module to continuously circulate an inert gas through a spent nuclear fuel ("SNF") canister in order to remove liquid moisture and dehumidify the gas that is ultimately sealed within the canister for transportation and storage. These systems operate to first remove the liquid moisture in the canister and then to dehumidify the circulating gas stream prior to sealing the SNF canister. The FGD system uses a low temperature refrigerant system and heat exchanger to cool the circulating gas stream to the point where the water vapor in it freezes onto the heat exchanger surface. The freezing of the water vapor on the exchanger surface acts to dehumidify the circulating gas stream. It is proposed that the following modification can be used as alternatives to the freeze dryer module.

SUMMARY OF THE INVENTION

It is therefore an object of the present invention to provide a method and system for drying a canister loaded with a high level radioactive waste ("HLW"), such as SNF.

Another object of the present invention is to provide a method and system for drying a canister loaded with HLW without physically accessing the contents of the canister to ensure that an acceptable level of dryness has reached within the canister.

Yet another object of the present invention is to provide a method and system for drying a canister loaded with HLW without subjecting the interior of the canister to prolonged sub-atmospheric conditions.

A further object of the present invention is to provide a method and system for preparing an SNF-loaded canister for dry storage that is easy to implement and/or time efficient.

A yet further object of the present invention is to provide a method and system for preparing a canister loaded with HLW for dry storage in a more cost effective and safer manner.

In one aspect, the invention is a method of preparing a canister having a cavity loaded with wet radioactive elements for dry storage, the method comprising: (a) providing a gas circulation system comprising a condensing module, a desiccant module, a gas circulator module; (b) connecting the gas circulation system to the canister so as to form a hermetically sealed closed-loop path that includes the cavity; (c) filling the hermetically sealed closed-loop path with a non-reactive gas; (d) circulating the non-reactive gas through the hermetically sealed closed-loop path until the condensing module is no longer removing substantial amounts of water from the circulating non-reactive gas, wherein the desiccant module is sealed off from the hermetically sealed closed-loop path during step (d); and (e) adding the desiccant module to the hermetically sealed closed-loop path and continuing to circulate the non-reactive gas through the hermetically sealed closed-loop path, the desiccant module dehumidifying the circulating the non-reactive gas.

In another aspect, the invention can be a system for preparing a canister having a cavity loaded with radioactive elements for dry storage, the apparatus comprising: a gas circulation system comprising a source of a condenser module, a desiccant module, a gas circulator module; the gas circulation system adapted to form a hermetically sealed closed-loop path when operably connected to the cavity of the canister to be prepared for dry storage; and means for adding and removing the desiccant module as part of the hermetically sealed closed-loop path.

In yet another aspect, the invention can be a method of preparing a canister having a cavity loaded with wet radioactive elements for dry storage, the method comprising: (a) providing a gas circulation system comprising a condensing module, a vacuum module, a gas circulator module; (b) connecting the gas circulation system to the canister so as to form a hermetically sealed closed-loop path that includes the cavity; (c) filling the hermetically sealed closed-loop path with a non-reactive gas; (d) circulating the non-reactive gas through the hermetically sealed closed-loop path until the condensing module is no longer removing substantial amounts of water from the circulating non-reactive gas, wherein the vacuum module is sealed off from the hermetically sealed closed-loop path during step (d); (e) discontinuing the circulation of the non-reactive gas through the hermetically sealed closed-loop path; (f) fluidly coupling the vacuum module to the cavity and fluidly isolating the cavity and the vacuum module; and (g) applying a vacuum pressure to the cavity via the vacuum module so as to create a sub-atmospheric pressure within the cavity until a desired vapor pressure is achieved in the cavity of the canister

DETAILED DESCRIPTION OF THE DRAWINGS

The present invention is an improvement over the drying methods, apparatus and systems disclosed in U.S. Pat. No. 7,210,247 and United States Patent Application Publication 2006/0272175A1. The following enhancements are proposed for the FGD drying systems for use in drying containers designed for dry storage of high level radioactive waste, such as MPCs loaded with SNF.

Figure 1:
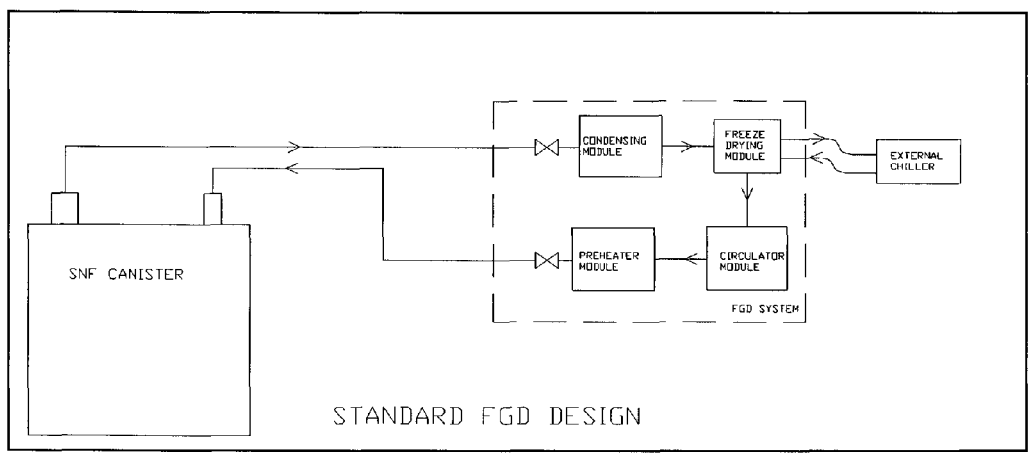
FIG. 1 is a schematic diagram of a prior art FGD system.
Figure 2:
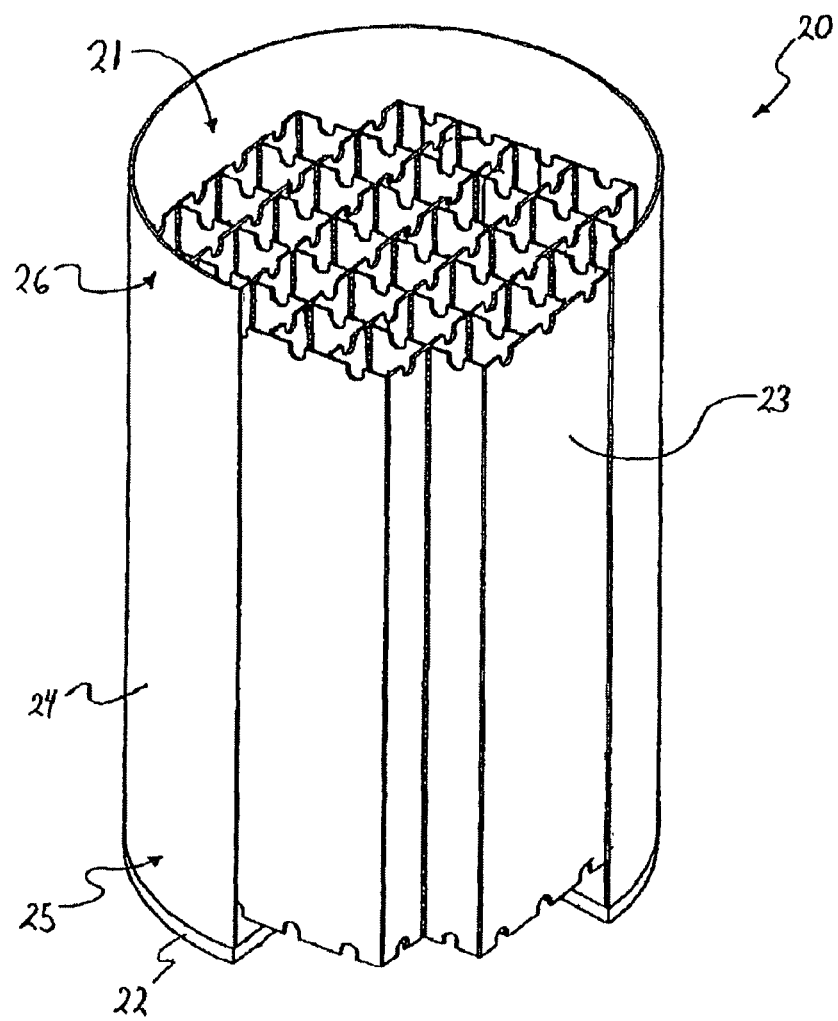
FIG. 2 is a perspective view of an embodiment of a prior art multi-purpose canister ("MPC") that can be used in conjunction with the present invention shown partially in section and empty.

FIG. 2 illustrates a canister 20 that is suitable for use with the present invention. The present invention is not limited to specific canister geometries, structures, or dimensions and is applicable to any type of enclosure vessel used to transport, store, or hold radioactive elements. While the exemplified embodiment of the invention will be described in terms of its use to dry a canister of spent nuclear fuel ("SNF"), it will be appreciated by those skilled in the art that the systems and methods described herein can be used to dry radioactive waste in other forms and in a variety of different containment structures as desired.

The canister 20 comprises a bottom plate 22 and a cylindrical wall 24 which forms a cavity 21. As used herein, the end 25 of the canister 20 that is closest to the bottom plate 22 will be referred to as the bottom of the canister 20 while the end 26 of the canister 20 that is furthest from the bottom plate 22 will be referred to as the top of the canister 20. The cavity 21 has a honeycomb grid 23 positioned therein. The honeycomb grid 23 comprises a plurality of rectangular boxes adapted to receive spent nuclear fuel ("SNF") rods. The invention is not limited by the presence of the honeycomb grid.

The canister 20 further comprises a drain pipe with an open bottom (not illustrated) located at or near the bottom of the canister 20 that provides a sealable passageway from outside of the canister 20 to the interior of the cavity 21. If desired, the drain opening can be located in the bottom plate 22 or near the bottom of the canister wall. The drain pipe can be opened or hermetically sealed using conventional plugs, drain valves, or welding procedures.

As illustrated in FIG. 2, the canister 20 is empty (i.e. the cavity 21 does not have SNF rods placed in the honeycomb grid 23) and the top 26 of the canister 20 is open. In utilizing the canister 20 to transport and store SNF rods, the canister 20 is placed inside a transfer cask 10 (FIG. 3) while the canister 20 is open and empty. The open transfer cask 10, which is holding the open canister 20, is then submerged into a spent fuel pool which causes the volume of the cavity 21 to become filled with water. SNF rods that are removed from the nuclear reactor are then moved under water from the spent fuel pool and placed inside the cavity 21 of the canister 20.

Figure 3:
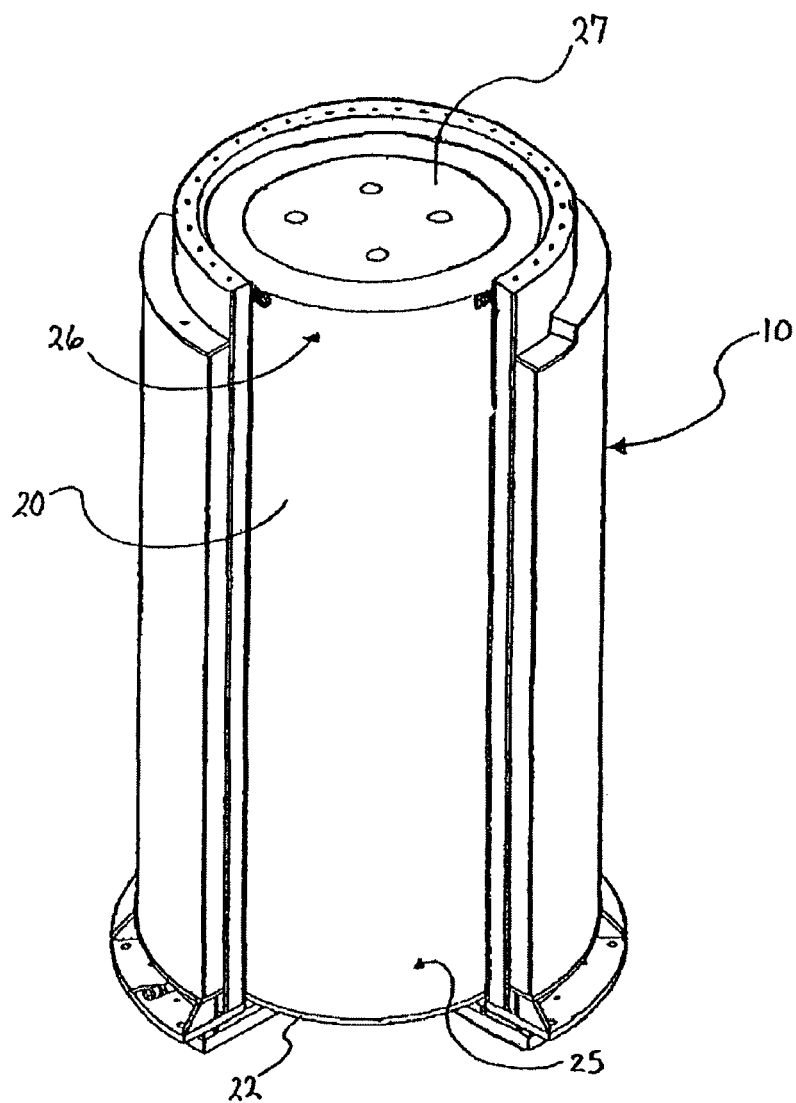
FIG. 3 is a perspective view of a prior art transfer cask partially in section with the MPC of FIG. 2 sealed and positioned in the transfer cask.

Preferably, a single bundle of SNF rods is placed in each rectangular box of the honeycomb grid 23. Once the cavity 21 is fully loaded with the SNF rods, the canister lid 27 (FIG. 3) is positioned atop the canister 20. The canister lid 27 has a plurality of sealable lid holes 28 that form a passageway into the cavity 21 from outside of the canister 20 when open. The transfer cask 10 (having the loaded canister 20 therein) is then lifted from the spent fuel pool by a crane and placed uprightly in a staging area (as shown in FIG. 3) so that the canister 20 can be properly prepared for dry-storage. This dry-storage preparation includes drying the interior of the canister 20 and sealing the lid 27 thereto.

Referring now to FIG. 3 exclusively, when in the staging area, the canister 20 (containing the SNF rods and pool water) is within the transfer cask 10. Both the canister 20 and the transfer cask 10 are in an upright position. Once in the staging area, the drain pipe attached to the canister lid 27 (not illustrated) with a bottom opening at or near the bottom 25 of the canister 20 is used to expel the bulk water that is trapped in the cavity 21 of the canister 20 using a blowdown gas (usually helium or nitrogen). Despite draining the bulk water from the cavity 21, residual moisture remains in the cavity 21 and on the SNF rods. However, before the canister 20 can be permanently sealed and transported to a storage cask for long-term dry storage or transportation, it must be assured that that cavity 21 and the SNF rods contained therein are adequately dried.

Because a low vapor pressure ("vP") within a container indicates that a low level of moisture is present, the United States Nuclear Regulatory Commission ("NRC") requires compliance to the 3 Torr or less vapor pressure ("vP") specification within the cavity 21 of HLW containing casks.

Figure 4:
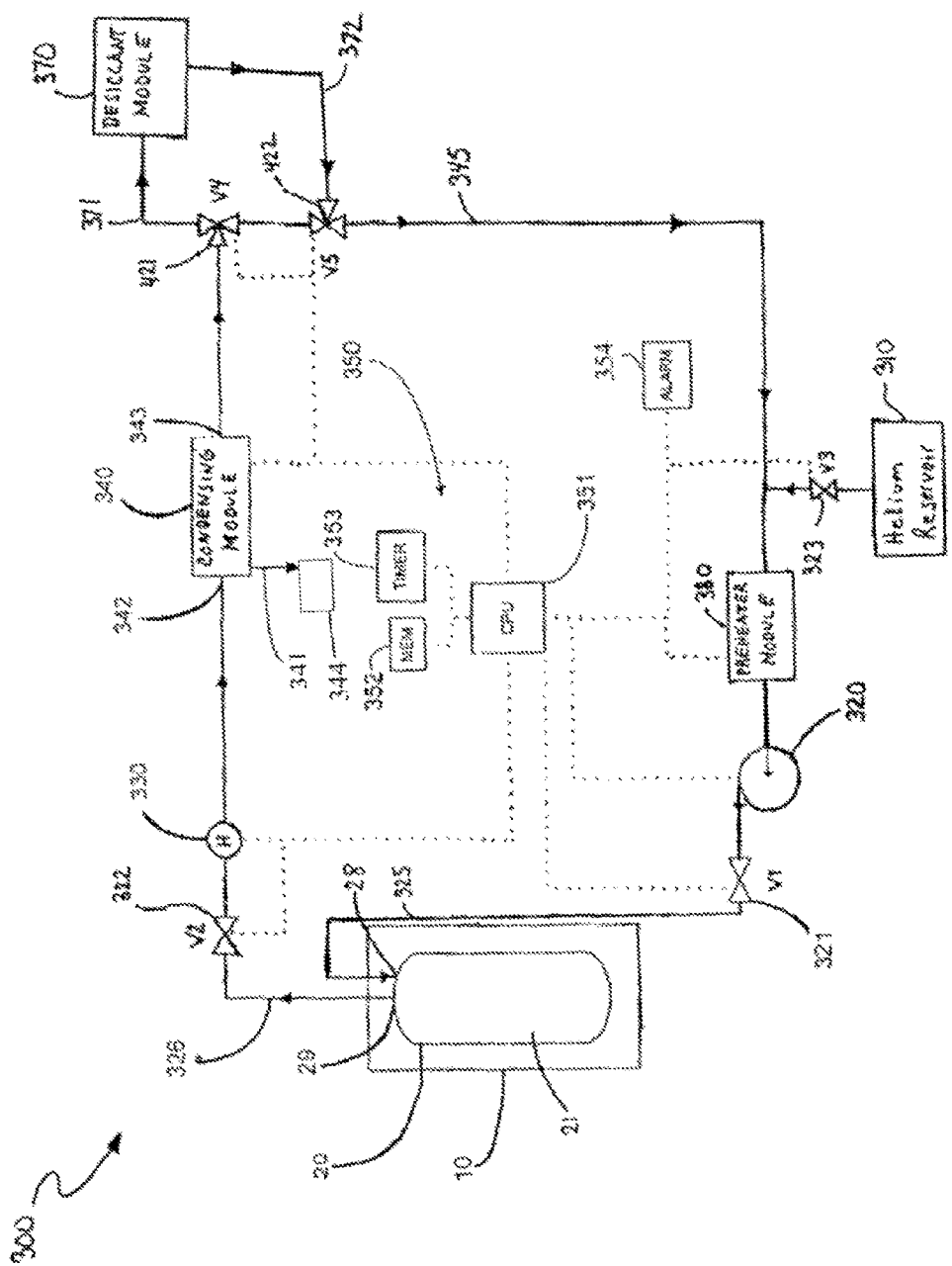
FIG. 4 is a schematic diagram of an FGD system according to one embodiment of the present invention that utilizes a desiccant module to dehumidify the circulating gas stream.

FIG. 4 is a schematic of an embodiment of an FGD system 300 capable of drying the cavity 21 to acceptable NRC levels without the need to intrusively measure the resulting vP within the cavity 21. Once the transfer cask 10, which is holding the canister 20, is positioned in the staging area and the bulk water is drained form the cavity 21, the drying system 300 is connected to the inlet 28 and outlet 29 of the canister 20 so as to form a closed-loop system. The closed-loop may or may not include the desiccant module 370 depending on the status of the three-way valves 421, 422. The gas supply line 325 is fluidly connected to the inlet 28 of the canister 20 while the gas exhaust line 326 is fluidly connected to the outlet 29 of the canister 20. The inlet 28 and outlet 29 of the canister are mere holes in the canister 20. If desired, proper port connections, seals, and/or valves can be incorporated into the inlet and outlet 28, 29.

The drying system 300 generally comprises a non-reactive gas reservoir 310, a gas circulator module 320, a plurality of two-way valves 321-323, a plurality of three-way valves 421-422, a dew point temperature hygrometer 330, a condensing module 340, a pre-heater module 380, a desiccant module 370, and a control system 350, which includes a suitably programmed microprocessor 351, a computer memory medium 352, a timer 353, and an alarm 354. While the illustrated embodiment of the drying system 300 is automated via the control system 350, neither the method nor system of the present invention is so limited. If desired, the functions carried out by the control system 350 can be carried out manually and/or omitted in some instances.

The helium reservoir 320, the pre-heater module 380, the gas circulator module 320, the canister 20, the hygrometer 330, condensing module 340, and the desiccant module 370 are fluidly connected so that a non-reactive gas, such as helium, can flow through the drying system 300 without escaping into the external environment. All of the gas lines connecting the aforementioned component can be formed of suitable tubing or piping. The piping and tubing can be constructed of flexible or non-flexible conduits. The conduits can be formed of any suitable material, such as metals, alloys, plastics, rubber, etc. All hermetic connections can be formed through the use of threaded connections, seals, ring clamps, and/or gaskets.

The helium gas reservoir 310 is used to store pressurized helium gas and feed helium gas to the loop for circulation by opening the valve 323. While helium gas is the preferred non-reactive gas for use in the present invention, any non-reactive gas can be used in conjunction with the system 300 and the operation thereof. For example, other suitable non-reactive gases include, without limitation, nitrogen, carbon-dioxide, light hydrocarbon gases such as methane, or any inert gas, including but not limited to noble gases (helium, argon, neon, radon, krypton and xenon).

When valve 323 is opened, the helium reservoir fills the closed loop with helium. The gas circulator 320 is operably coupled to the gas supply line 325. The position of the gas circulator 320 in the loop can be varied as desired. When activated, the gas circulator 320, which can be a blower, forces helium gas through the closed-loop (which includes the canister 20) at the desired flow rate. While a single gas circulator 320 is illustrated as being incorporated into the drying system 300, the invention is not so limited and any number of circulator or pumps can be used. The exact number of pumps will be dictated on a case-by case design basis, considering such factors as flow rate requirements, pressure drops in the system, size of the system, and/or number of components in the system. The direction of the helium gas flow through system 300 is indicated by the arrows on the fluid hues.

Valve 321, 322 are operably coupled to the gas supply line 325 and the gas exit line 326 respectively. The valves 321, 122 are used to control the flow to the cavity 21 of the canister 20. Specifically, the valves 321, 322 can be used to isolate the canister 20 from the rest of the loop when desired, such as during connection and disconnection. All valves used herein can be adjustable flow rate valves or simple on/off valves. in other embodiments of the invention, mass flow rate controllers can be used. As with the circulators, any number of valves can be incorporated throughout the system 300 as desired. Only those valves considered important to the principles of the present invention have been illustrated. Moreover, the invention is not limited by any specific placement of the valve(s) or pump(s) along the closed-loop flow circuit so long as the claimed methods can be performed.

The dew-point temperature hygrometer 330 is operably coupled to the gas exhaust line 326 so that the dew-point temperature of the helium gas exiting the cavity of the canister 20 can be measured. Suitable means for dew point temperature measurement include direct moisture sensing devices, such as hygrometers, and other means, such as gas chromatography or mass spectroscopy. The hygrometer 330 preferably includes a digital signal in some embodiments. The dew point temperature hygrometer 330 repetitively measures the dew point temperature of the helium gas exiting the cavity 21. There is no requirement as to the sampling rate for repetitive measurements. For example, the dew point temperature hygrometer 330 can measure the dew point temperature of the helium gas multiple times per second or only once every few minutes. In some embodiments, the time intervals between repetitive measurements will be so small that the measurements will appear to be essentially continuous in nature (i.e., in real-time). The time intervals will be determined on case-by case design basis, considering such factors as functionality requirements of the system and the flow rate of the helium gas.

The inlet 342 of the condenser module 340 is coupled to the gas exhaust line 326 while the outlet 343 is fluidly coupled to the recirculation line 345. The condenser module 340 is provided to adequately de-moisturize the wet helium gas that exits the cavity 21 of the canister 20 during the liquid removal stage (Phase I) of drying the canister 20. The helium gas leaving the condenser module 340 can be re-circulated back into the canister 20 after passing through the preheater module 380 so that it can absorb more moisture. The condenser module 340 is connected via drain 341 to a moisture accumulator 344. The moisture accumulator 344 can be monitored to determine when Phase I is complete and the system 300 is ready for Phase II drying (Phase II drying is the dehumidification of the circulating gas stream prior to sealing the SNF canister). When monitoring the moisture accumulator 344, the end of Phase I is detected by no more moisture/liquid accumulating in the reservoir of the moisture accumulator 344, Phase I drying is complete. Alternatively, the hygrometer 330 can be used to determine when Phase I is complete. When using the hygrometer 330, the end of Phase I is detected by the hygrometer 330 obtaining a steady dew point measurement.

The desiccant module 370 is a pressure vessel or vessels containing a single use or regenerative desiccant material. Candidate desiccant materials include Silica gel, Activated alumina, Molecular Sieve and similar hygroscopic type materials that would adsorb or absorb the water vapor from the gas stream. During Phase I drying, the desiccant module 370 is valved out from the circulating gas stream by closing valves 421, 422 so that the inlet line 371 and outlet line 372 of the desiccant module 370 is sealed from the recirculation line 345. This avoids overloading the desiccant materials with water. After the liquid water has been removed from the canister 20 and stripped from the circulating gas by the condenser module 340 (i.e., Phase I drying is complete), the circulating gas stream would be routed through the desiccant module 370 by opening the valves 421, 422 so that the inlet and outlet lines 421, 422 are in fluid communication with the recirculation line 345. The desiccant module 370 dehumidifies the circulating gas stream to the appropriate mass density prior to sealing the canister, thereby completing Phase II drying.

The desiccant module 370 can be sized to dehumidify one or more SNF canisters before the desiccant would need to be disposed of or regenerated. Water can be removed from the desiccant through a regenerative process, which consists of heating the desiccant material to a known temperature and passing a dry gas such as air, nitrogen, or other inert gas over the desiccant bed. The desiccant can also be dried as necessary through heating, UV exposure, or other conventional drying process and subsequently reused.

The drying system 300 further comprises an automation system 350. This is optional. The automation system 350 comprises a CPU 351, a computer memory medium 352, a timer 353, and an alarm 354. The CPU 351 is a suitable microprocessor based programmable logic controller, personal computer, or the like. The computer memory medium 352 can be a hard drive that comprises sufficient memory to store all of the necessary computer code, algorithms, and data necessary for the operation and functioning of the drying system 300, such as predetermined time predetermined dew-point temperature, flow rates, and the like. The timer 353 is a standard digitalized or internal computer timing mechanism. The alarm 354 can be a siren, a light, an LED, a display module, a speaker, or other device capable of generating audio and/or visual stimulus. While an alarm 354 is illustrated and described, any instrumentation, device, or apparatus that inform an operator that the drying system 300 has completed a drying process can be used. For example, a computer screen can simply indicate that the canister is dry via text or visuals.

The CPU 351 includes various input/output ports used to provide connections to the various components of the drying system 300 that need to be controlled and/or communicated with. The CPU 351 is operably coupled to these components via electrical wires, fiber-optic lines, co-axial cables, or other data transmission lines. Wireless communication can also be used. These connections are indicated by the dotted lines in FIG. 4. The CPU 351 can communicate with any and all of the various components of the drying system 300 to which it is operably connected in order to control the drying system 300, such as: (1) activating or deactivating the gas circulator 320; (2) opening, closing, and/or adjusting the valves 321-323, 421-422; (3) activating or deactivating the condenser module 340 and the pre-heater 380; and (4) activating or deactivating the alarm 354.

The CPU 351 (and/or the memory 352) is also programmed with the proper algorithms to receive data signals from the dew-point hygrometer 330, analyze the incoming data signals, compare the values represented by the incoming data signals to stored values and ranges, and track the time at which the values represented by the incoming data signals are at or below the stored values. The type of CPU used depends on the exact needs of the system in which it is incorporated.

A method of preparing an MPC 20 loaded with wet SNF will now be described according to an embodiment of the present invention is illustrated. The method will be described in relation to the drying system 300 of FIG. 4 for ease of description and understanding. However, the method is not limited to any specific structure or system, and can be carried out by other systems and/or apparatuses.

A cask 10 containing the SNF loaded canister 20 is positioned in a staging area after being removed from the cooling pool/pond. As discussed above, the cavity 21 of the canister 20 is filled with water from the pool at this time. The bulk water is drained from the cavity 21 of the canister 20 via a properly positioned drain.

Despite the bulk water being drained from the cavity 21 of the canister 20, the interior of the cavity 21 and the SNF are still moisture bearing and need further de-moisturization for long-term dry storage. In order to further dry the cavity 21 and the SNF, the drying system 300 is utilized. The canister 20 remains in the cask 10 during the drying operation. The gas supply line 325 is fluidly coupled to the inlet 28 of the canister 20 while the gas exhaust line 326 is fluidly coupled to the outlet 29 of the canister 20. As a result, a closed-loop fluid circuit is formed in which the cavity 21 of the canister 20 forms a portion of the fluid circuit when valves 321, 322 are opened. At this time, the valves 421, 422 are in a position that seals the inlet and outlet lines 371, 372 from the line 345, thereby removing the desiccant module 370 from the main fluid circuit. Valve 323 is also closed at this time to avoid the wasted release of helium.

Once the drying system 300 is properly hooked up to the canister 20 the operator activates the drying system 300. The drying system 300 can be activated manually by switching on the equipment or in an automated fashion by the CPU 351. When activated in an automated fashion, an operator will activate the drying system 300 by entering a system activation command into a user input device (not illustrated), such as a keyboard, computer, switch, button, or the like, which is operably coupled to the CPU 351. Upon receiving the associated system activation signal from the user input device, the CPU 351 sends the appropriate activation signals to the components of the system 300.

Valves 321, 322 are opened first. The valve 323 is then opened, thereby releasing pressurized helium from the helium reservoir 30 that floods the closed-loop fluid circuit (which includes the gas supply line 325, the pre-heater module 380, the canister 20, the gas exhaust line 326, the condensing module 340, and the recirculation line 345). The desiccant module 370 is not part of the closed-loop fluid circuit at this time. However, in an alternative embodiment, the desiccant module 370 may be part of the closed-loop fluid circuit at this time to avoid a pressure drop later when it is added to circuit after Phase I drying. In this scenario, the desiccant module 370 would be removed from the circuit after it is filled with helium and before continuing with the gas circulation for Phase I drying.

Once the desired closed-loop circuit is filled with helium, valve 323 is closed. The gas circulator 320 is then activated, along with the pre-heater module 380 and the condenser module 340, thereby circulating the helium gas through the fluid circuit. As a result, Phase I drying begins. The pre-heater module 380 heats the helium before the entering the canister 20 and the condenser module 340 removes moisture from the helium that exits the canister 20.

The flow rate of the helium gas through the drying system 300 is controlled by either the gas circulator 320 or a flow rate valve. In one embodiment to the present invention, the CPU 351 flows helium gas through the canister 20 at a flow rate of approximately 400 lb/hr. However, the invention is not so limited and other flow rates can be used. The exact flow rate to be used in any particular drying operation will be determined on a case-by-case design basis, considering such factors as the open volume of the canister's cavity, the target dryness level within the canister's cavity, the initial moisture content within the canister's cavity, the moisture content of the helium gas maintained within the reservoir, desired number of hourly volume turnovers for the canister etc.

Upon being activated, the dry helium gas flows into the wet cavity 21 of the canister 20 via the inlet 28. Upon entering the cavity 21, the dry helium gas absorbs water from the SNF and internal surfaces of the cavity 21 in the form of water vapor. The moisture laden helium gas then exits the cavity 21 via the outlet 29. If the Phase I drying is being monitored by the hygrometer 330, the wet helium gas that exits the cavity 21 is repetitively measured by the hygrometer 330. As the hygrometer 330 measures the dew point temperature of the wetted helium gas, it generates data signals indicative of the measured dew point temperature values and transmits these data signals to the CPU 351. Alternatively, if the Phase I drying is being monitored via an accumulator coupled to the condenser, the hygrometer is not necessary at this time and can be shut off.

As the wetted helium gas exits the canister 20 it enters the condenser module 340, which has been activated by the CPU 351. The wetted helium gas exiting the canister 20 is de-moisturized within the condenser 340 prior to being re-circulated back to the pre-heater 380 via the line 345. The liquid water condensed out of the helium gas within the condenser module 340 drains out via the line 341 and into a moisture accumulator where it is monitored to detect the end of Phase I drying.

The flow of helium through the circuit is continued until no more liquid is being condensed out by the condenser 340 (which is detected by either no more liquid accumulating in the moisture accumulator or a steady state reading by the hygrometer 330), Phase I drying is determined to be complete.

At this time, valves 421, 422 are open so that the inlet and outlet lines 371, 372 are in fluid communication with the line 345, thereby adding the desiccant module to the loop/circuit. This begins Phase II drying, dehumidification of the circulating helium gas stream prior to sealing the SNF canister. Once the desiccant module 370 has been added to the gas-circulation loop, the helium continues to be circulated as in Phase I. However, the hygrometer 330 now becomes active (if not active before) to determine the end of Phase II drying.

During Phase II, the hygrometer 330 is repetitively measuring the dew point of the wet helium gas that exits the cavity 21. As the hygrometer 330 measures the dew point temperature of the wetted helium gas, it generates data signals indicative of the measured dew point temperature values and transmits these data signals to the CPU 351. Upon receiving the data signals indicative of the measured dew point temperature values, the CPU 351 compares the measured values to a predetermined dew point temperature value that is stored in the memory medium 352. The predetermined dew point temperature is selected so as to be indicative that the inside of the cavity 21 and the SNF is sufficiently dry for long term storage. In one embodiment, the predetermined dew point temperature is selected so as to correspond to a vapor pressure in the cavity 21 that is indicative of an acceptable level of dryness, such as for example 3 Torr or less. In such embodiments, the predetermined dew point temperature can be selected using either experimental or simulated correlations.

An exemplary embodiment of how one selects the predetermined dew point temperature is described in United States Application Publication 2006/0272175A1. published Dec. 7, 2006 to Krishna P. Singh. These teachings are incorporated by reference.

After the CPU 351 compares the measured dew point temperature to the predetermined dew point temperature, the CPU 351 then determines whether the measured dew point temperature is less than or equal to the predetermined dew point temperature. This comparison is performed for each signal received by the CPU 351.

If the measured dew point temperature of the wetted helium gas exiting the canister is determined to be above the predetermined dew point temperature, the CPU 351 will continue to determine whether the timer 353 has been activated. If the timer 353 is activated, the CPU 351 deactivates the timer 353 and returns to receiving data signals for analysis. If the timer 353 is not activated, the CPU 351 returns to receiving data. Either way, if the measured dew point temperature of the wetted helium gas exiting the canister is determined to be above the predetermined dew point temperature, the drying system 300 continues to circulate the dry helium gas into and through the cavity 21 of the canister 20, thereby continuing Phase II drying.

However, if the measured dew point temperature of the wetted helium gas exiting the canister is determined to be at or below the predetermined dew point temperature, the CPU 351 will activate/start the timer 353. The timer 353 is programmed to run for a predetermined time. The selection and purpose of the predetermined time will be discussed in greater detail below.

Once the timer is activated, the CPU 351 proceeds to determine whether the timer 353 has expired (i.e., whether the predetermined time has passed) without receiving a data signal indicative of a measured dew point temperature above the predetermined dew point temperature. If this answer is NO, the CPU 351 returns to the beginning and the drying system 300 continues to circulate helium gas through the cavity 21 of the canister 20 and repeat the operations of steps discussed above until the predetermined time expires. In other words, the drying process continues until the measured dew point temperature of the wetted helium gas exiting the canister falls below (or equal to) the predetermined dew point temperature, and remains so for the predetermined time (without subsequently rising above the predetermined dew point temperature).

By requiring that the measured dew point temperature of the wetted helium gas exiting the canister not only reach, but remain at or below the predetermined dew point temperature for the predetermined time, it is ensured that the cavity 21 and the SNF therein are sufficiently dried within an acceptable safety factor. This, along with the means for selecting the predetermined time, are described fully in United States Application Publication 2006/0272175A1, published Dec. 7,2006 to Krishna E Singh. These teachings are incorporated by reference.

Once the predetermined time expires, and the measured dew point temperature remains at or below the predetermined dew point temperature for the entire predetermined time, the CPU 351 generates shut down signals that are transmitted to the system 300. Upon receiving the shutdown signals, the circulator 320 is deactivated and the flow of helium gas through the drying system is ceased. The valves 321, 322 are closed.

The CPU 351 generates and transmits an activation signal to the alarm 354. Upon receiving the activation signal, the alarm 354 is activated. Depending on the type of device that is used as the alarm 354, the response of the alarm 354 to the activation signal can vary greatly. However, it is preferred that the alarm's 354 response be some type of audio and/or visual stimuli that will inform the operator that the canister 20 is dry. For example, activation of the alarm 354 can generate a sound, display a visual representation on a computer screen, illuminate an LED or other light source, etc.

Upon being informed by the alarm 354 that the cavity 21 of the canister 20 and the SNF is sufficiently dried, the operator disconnects the drying system from the canister 20 and seals the canister 20 for storage.

Figure 5:
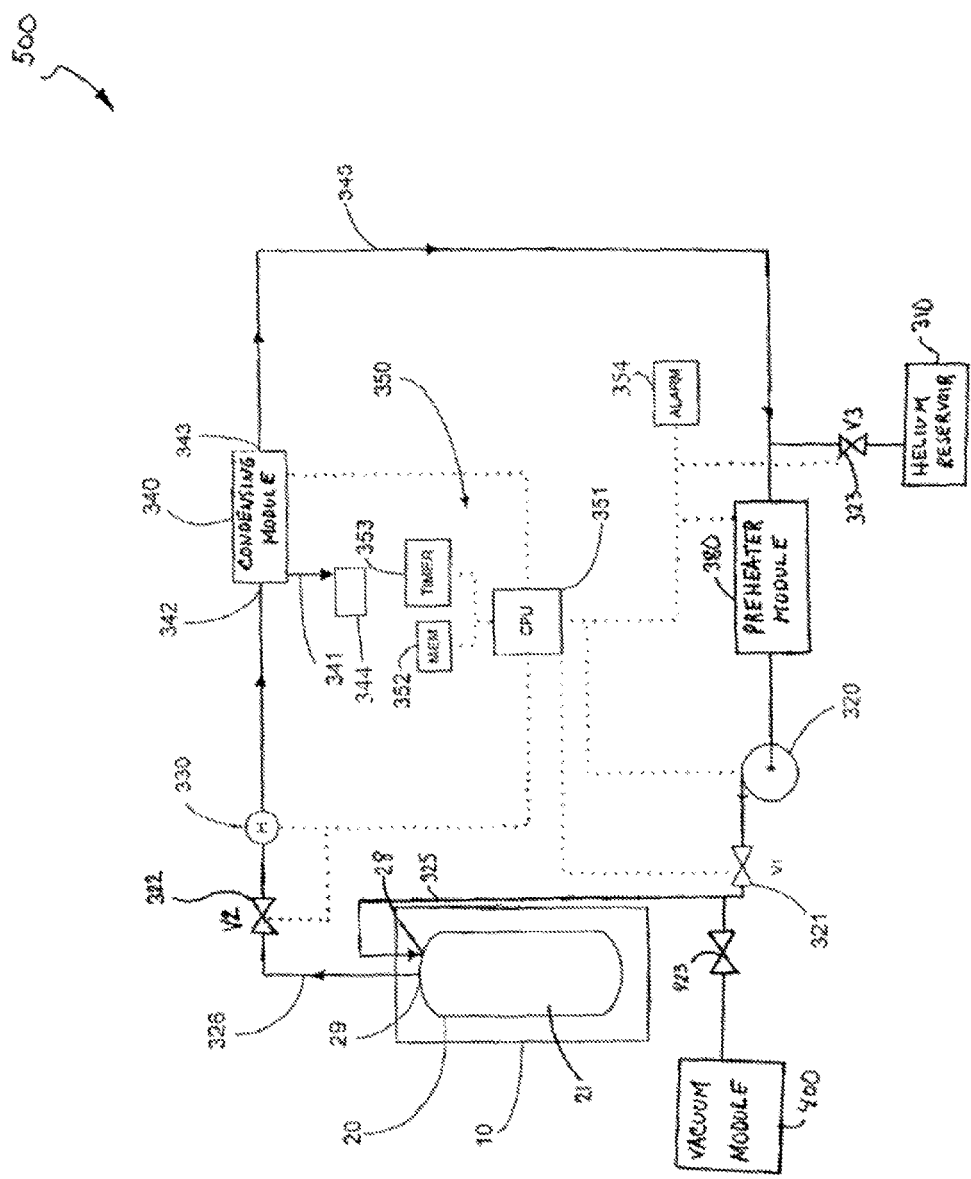
FIG. 5 is a schematic diagram of an FGD system according to another embodiment of the present invention that utilizes a vacuum module to dehumidify the MPC.

Referring now to FIG. 5, an FGD system, 500 according to second embodiment of the present invention is disclosed. The FGD drying system 500 is similar to the FGD drying system 300 discussed above in both structure and functioning, In order to avoid redundancy, only those aspects of FGD system 500 (and its functioning) that differ from the FGD system 300 will be discussed.

The FGD system 500 essentially replaces the desiccant module 370 of FGD system 300 with a vacuum module 400, which can be a conventional vacuum pump. The vacuum module 400 is downstream of valve 321 and upstream of the canister 20. The vacuum module 400 is operably coupled to the fluid circuit and connected and disconnected through the valve 423.

When using the FGD system 500, the Phase I drying of the canister 20 is performed in an essentially identical manner as described above for FGD system 300, wherein the vacuum module is isolated from the gas-circulation loop rather than the desiccant module.

While the FGD system 500 utilizes vacuum pressure to perform the Phase II drying, it prevents the SNF cladding from heating up to unacceptable temperatures that may compromise the fuel cladding integrity. In prior art vacuum systems, in order for liquid water to be removed from the SNF canister, the canister must be held at a low vacuum level for an extended period while the liquid water boils off. The extended period of time when the fuel is surrounded by a near vacuum impedes removal of the decay heat from the fuel itself. However, in the FGD system 500 (and its method) the time in which the canister 20 is subject to vacuum pressure is very short compared to conventional methods.

The FGD system 500 runs through the Phase I drying until all liquid water is removed as discussed above. The circulating helium gas keeps the SNF assemblies at a relatively low temperature during this process. The hygrometer 330 of the FGD system 500 is purely optional as it is only used for the determination of the completion of Phase I drying. It is not used in the Phase II operation.

Once Phase I is complete with the FGD system 500, the valves 321, 322 are closed. The valve 423 is opened and the vacuum module 400 is activated, thereby creating a sub-atmospheric condition within the cavity 21. The vacuum module 400 preferably evacuates the cavity 21, and holds the cavity 21 at less than 3 torr for 30 minutes to verify cavity dryness. Once the time is completed, the cavity is backfilled with an inert gas by proper manipulation of the valves. Because there is no residual liquid water in the canister 20 after Phase I, the canister cavity 21 is rapidly evacuated (in 30 minutes or less) to a vapor pressure level below 3 torr without concerns about excessive water vapor flooding the vacuum system. Thus the time at low vacuum can be held to a period of less than 2 hours and therefore prevent unacceptably high fuel cladding temperatures.

The foregoing discussion discloses and describes merely exemplary embodiments of the present invention. As will be understood by those skilled in this art, the invention may be embodied in other specific forms without departing from the spirit or essential characteristics thereof. Specifically, in some embodiments, the drying method of the invention can be carried out manually. In such an embodiment, the pumps and all other equipment will be activated/controlled manually. The readings by the hygrometer and the accumulator can be visually observed by the operator and the timing sequence operations can be performed manually.

What is claimed is:

1. A method of preparing a cavity loaded with wet radioactive elements for dry storage in two stages, the method comprising:
   (a) providing a gas circulation system comprising a condensing module, a vacuum module, a gas circulator module;
   (b) connecting the gas circulation system to the cavity so as to form a hermetically sealed closed-loop path that includes the cavity, the condensing module, and the gas circulator module;
   (c) filling the hermetically sealed closed-loop path with a non-reactive gas;
   (d) circulating the non-reactive gas through the hermetically sealed closed-loop path until the condensing module is no longer removing substantial amounts of water from the circulating non-reactive gas, wherein the vacuum module is sealed off from the hermetically sealed closed-loop path during step (d);
   (e) discontinuing the circulation of the non-reactive gas through the hermetically sealed closed-loop path;
   (f) fluidly coupling the vacuum module to the cavity and fluidly isolating the cavity and the vacuum module;
   (g) applying a vacuum pressure to the cavity via the vacuum module so as to create a sub-atmospheric pressure within the cavity;
   (h) holding the cavity at sub-atmospheric pressure for a predetermined period of time while continuing to apply vacuum pressure to the cavity to remove residual moisture, wherein the predetermined period of time is selected to prevent overheating cladding on the radioactive elements; and
   (i) discontinuing application of vacuum pressure to the cavity after the predetermined period of time has lapsed.

2. The method of claim 1, further comprising:
   continuing step (g) until a desired vapor pressure is achieved in the cavity.

3. The method of claim 1, further comprising:
   (j) back-filling the cavity with dry non-reactive gas; and
   (k) sealing the cavity.

4. The method of claim 1, wherein it is determined that condenser is no longer removing substantial amounts of water from the circulating non-reactive gas by monitoring a moisture accumulator.

5. The method of claim 1, wherein it is determined that condenser is no longer removing substantial amounts of water by measuring the dew point temperature of the circulating non-reactive gas exiting the cavity during step(d).

6. The method of claim 1, wherein the cavity is formed within a canister configured to store radioactive elements.

7. The method of claim 1, wherein the predetermined period of time is less than 2 hours.

8. The method of claim 1, wherein the predetermined period of time is 30 minutes.

9. A method of preparing a cavity loaded with wet radioactive elements for dry storage in two stages, the method comprising:
   (a) fluidly coupling a condensing module and a gas circulator module to the cavity to form a hermetically sealed closed-loop path;
   (b) filling the hermetically sealed closed-loop path with a non-reactive gas;
   (c) circulating the non-reactive gas through the hermetically sealed closed-loop path until the condensing module is no longer removing substantial amounts of water from the circulating non-reactive gas;
   (d) decoupling the condensing module and the gas circulator module to the cavity;
   (e) fluidly coupling a vacuum module to the cavity;
   (f) creating a sub-atmospheric pressure within the cavity via the vacuum module;
   (h) holding the cavity at sub-atmospheric pressure for a predetermined period of time while continuing to apply vacuum pressure to the cavity to remove residual moisture, wherein the predetermined period of time is selected to prevent overheating cladding on the radioactive elements; and
   (i) discontinuing application of vacuum pressure to the cavity after the predetermined period of time has lapsed.

10. The method of claim 9, further comprising:
    continuing step (f) until a desired vapor pressure is achieved in the cavity.

11. The method of claim 9, further comprising:
    (j) back-filling the cavity with dry non-reactive gas; and
    (k) (h) sealing the cavity.

12. The method of claim 9, wherein it is determined that condenser is no longer removing substantial amounts of water from the circulating non-reactive gas by monitoring a moisture accumulator.

13. The method of claim 9, wherein it is determined that condenser is no longer removing substantial amounts of water by measuring the dew point temperature of the circulating non-reactive gas exiting the cavity during step (c).

14. The method of claim 9, wherein the cavity is formed within a canister configured to store radioactive elements.

15. The method of claim 9, wherein the predetermined period of time is less than 2 hours.

16. The method of claim 9, wherein the predetermined period of time is 30 minutes.

\* \* \* \* \*